US006565767B2

(12) United States Patent
Hattori et al.

(10) Patent No.: US 6,565,767 B2
(45) Date of Patent: May 20, 2003

(54) POLYMER PARTICLES AND POLISHING MATERIAL CONTAINING THEM

(75) Inventors: Masayuki Hattori, Tokyo (JP);
Masayuki Motonari, Tokyo (JP);
Akira Iio, Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 09/897,129

(22) Filed: Jul. 3, 2001

(65) Prior Publication Data

US 2001/0039322 A1 Nov. 8, 2001

Related U.S. Application Data

(62) Division of application No. 09/433,213, filed on Nov. 4, 1999, now abandoned.

(30) Foreign Application Priority Data

Nov. 5, 1998 (JP) ........................................... 10-314739

(51) Int. Cl.⁷ ................................................ C09K 13/00
(52) U.S. Cl. .................... 252/79.1; 252/79.4; 252/79.3; 106/3; 216/89; 438/693; 451/36
(58) Field of Search ............................... 252/79.1, 79.4, 252/79.5; 106/3; 216/89; 438/693; 451/36

(56) References Cited

U.S. PATENT DOCUMENTS

| | | | |
|---|---|---|---|
| 4,440,745 A | | 4/1984 | Schmidt et al. |
| 4,911,903 A | * | 3/1990 | Unger et al. ................. 423/335 |
| 5,728,308 A | | 3/1998 | Muroyama |
| 5,967,964 A | | 10/1999 | Hattori et al. |

FOREIGN PATENT DOCUMENTS

| DE | 41 24 588 | 1/1993 |
|---|---|---|
| EP | 0 773 270 | 5/1997 |
| EP | 0 831 136 | 3/1998 |
| EP | 0 844 290 | 5/1998 |
| JP | 8-3540 | 1/1996 |
| JP | 9-324174 | 12/1997 |
| JP | 10-45403 | 2/1998 |
| WO | WO 97/07056 | 2/1997 |

OTHER PUBLICATIONS

W. Stoeber, et al., *Controlled Growth of Monodisperse Silica Spheres in the Micron Size Range*, Journal of Colloid and Interface Science, vol. 26, pp. 62–69, 1968.
*Science Forum Publications*, pp. 140–143, CMP Science, (1997) w/partial English translation.

* cited by examiner

Primary Examiner—Margaret G. Moore
(74) Attorney, Agent, or Firm—Oblon, Spivak, McClelland, Maier & Neustadt, P.C.

(57) ABSTRACT

The polymer particles of the invention are characterized by being obtained by polycondensation of at least one from among Compound 1 represented by general formula (1), its hydrolysates and its partial condensates, and at least one from among Compound 2 represented by general formula (2), its hydrolysates and its partial condensates, and by having a mean particle size of 3–1000 nm.

$$M(OR^1)_z \qquad (1)$$

$$(R^2)_n M(OR^3)_{z-n} \qquad (2)$$

where M is Al, Si, Ti, V, Cr, Mn, Fe, Co, Ni, Cu, Zn, Ge, Zr, Nb, Mo, Sn, Sb, Ta, W, Pb or Ce; z is the atomic valence of M; $R^1$ and $R^3$ are each an alkyl group of 1–5 carbon atoms, an acyl group of 1–6 carbon atoms or an aryl group of 1–9 carbon atoms; $R^2$ is a monovalent organic group of 1–8 carbon atoms; n is an integer of from 1 to (z–2); and $R^1$, $R^2$ and $R^3$ may be the same or different. These particles are used in polishing compositions used for chemical mechanical polishing.

15 Claims, No Drawings

POLYMER PARTICLES AND POLISHING MATERIAL CONTAINING THEM

This application is a Divisional of U.S. application Ser. No. 09/433,213, filed on Nov. 4, 1999, now abandoned.

BACKGROUND OF THE INVENTION

The present invention relates to polymer particles obtained by polycondensation of at least one from among Compound 1 represented by the following general formula (1): [M(OR$^1$)$_z$], hydrolysates of Compound 1 and partial condensates of Compound 1 (hereafter also collectively referred to as "Compound 1 and the like") and at least one from among Compound 2 represented by the following general formula (2): [(R$^2$)$_n$M(OR$^3$)$_{z-n}$], hydrolysates of Compound 2 and partial condensates of Compound 2 (hereafter also collectively referred to as "Compound 2 and the like"). The present invention further relates to a polishing material (particularly chemical Mechanical polishing slurry (CMP slurry)) containing an aqueous dispersion prepared by dispersing the polymer particles in water.

For chemical Mechanical polishing (CMP) of semiconductor wafers and the like, the abrasive used have conventionally been aqueous dispersions of high-purity inorganic particles such as silica or alumina, synthesized mainly by gas phase reaction methods. However, inorganic particles synthesized by gas phase reaction methods exhibit severe secondary aggregation, and when preparing the aqueous dispersion it is necessary to fracture and fragment the aggregates in the water. Insufficient fracturing and fragmentation of the aggregates creates a problem in that the aqueous dispersion will become more viscous or gelled with time thus losing its fluidity, or the aggregates will separate and precipitate, rending the dispersion unusable as a polishing material.

Many different apparatuses have been proposed for dispersion of aggregates of inorganic particles synthesized by gas phase reaction methods. The use of such apparatuses, however, results in the problem of contamination of metals and other impurities. Another problem is that fracturing and fragmentation of the aggregates cannot be adequately achieved, and coarse particles 5 μm or greater in size remain that raise the viscosity and cause gelation or sedimentation. These coarse particles also create scratches on the surfaces of polishing wafer, such as wafers, during the polishing step of chemical mechanical polishing or the like, and sometimes the inorganic particles remain on the surfaces of the wafers, and the like, after washing.

Methods for synthesis of particulate silica in solutions are also known. In JOURNAL OF COLLOID AND INTERFACE SCIENCE 26, 62–69 (1968) there is described a method of synthesizing nearly spherical-shaped high-purity silica with a mean particle size of 50–2000 nm in an alkaline aqueous solution, using tetraethoxysilane as the starting material in the presence of an alcohol. Using this silica as abrasive for chemical mechanical polishing has the advantage of minimal scratching, such as taught on page 142 of CMP SCIENCE (Science Forum Publications, 1997). However, it has a problem in that the polishing rate is low and the abrasive tend to remain in the surface of polishing wafer and the like after washing.

The reason for the low polishing rate is that the particles are nearly spherical and too hard, and the abrasives therefore roll on the surface of polishing wafer, failing to adequately function as a polishing material, particularly a CMP slurry. Particularly when the polishing wafer is a ductile metal such that numerous abrasives remain on the surface of polishing wafer after washing, the particles that are nearly spherical and hard become buried in the polishing wafer surface.

It has been conventional to use polymer particles with a narrow particle size distribution obtained by copolymerizing vinyl monomers, and the like., for such uses as standard particles, diagnostic agent carrier particles, lubricants and the like. However, such polymer particles do not always have sufficient hardness and heat resistance, and when used as standard particles or lubricants, application of excess shear stress or exposure to high temperature can cause deformation or destruction of the particles, and therefore their uses are limited. In order to deal with these problems there have been proposed particles made of copolymers of crosslinkable vinyl monomers, and the like., that are copolymerized with a high degree of crosslinking. However, particles made of such crosslinked polymers have lower hardness and insufficient heat resistance compared to inorganic-based particles, and therefore are not suitable for a very wide field of uses.

For uses such as electronic materials, magnetic materials, heat-resistant materials, and the like, there have been employed particles made of numerous metal compounds, and a variety of composite particles have been proposed for diverse purposes. As such types of composite particles there may be mentioned composite particles comprising iron oxide particles coated with silicon compounds, so that in production of needle-shaped magnetic material by heat treatment, shape collapsing and sintering between magnetic material is prevented; composite particles comprising iron powder coated with copper as a high strength material for powder metallurgy; and composite particles comprising iron oxide particles coated with antimony oxide and aluminum oxide for improved heat resistance. However, aqueous dispersions containing these composite particles have a problem in terms of shelf life, and since they all are composed of metal compounds, they are too hard and are not always adequately suited for diverse purposes. The development of polymer particles with appropriate hardness has thus become a necessity particularly in the fields of electronic materials, magnetic materials, optical materials and so forth.

SUMMARY OF THE INVENTION

It is an object of the present invention to provide polymer particles with sufficient strength and hardness, having excellent heat resistance and appropriate flexibility, that are useful as a polishing material, particularly a CMP slurry, and the like. It is another object of the invention to provide a CMP slurry that is useful for chemical mechanical polishing particularly of semiconductor wafers, magnetic disks and the like, that allows a high polishing rate with few scratches, and that leaves little residue on the surface of polishing wafer. It is yet another object of the invention to provide a polymerization technique whereby polymer particles that can only be made as small as about 50 nm at most according to the prior art, can be made as small as 3 nm.

The polymer particles according to a first aspect of the present invention are characterized by being obtained by polycondensation of at least one from among Compound 1 represented by general formula (1) below, hydrolysates of Compound 1 and partial condensates of Compound 1, and at least one from among Compound 2 represented by general formula (2) below, hydrolysates of Compound 2 and partial condensates of Compound 2, and by having a mean particle size of 3–1000 nm.

$$M(OR^1)_z \quad (1)$$

$$(R^2)_nM(OR^3)_{z-n} \quad (2)$$

(In general formula (1) and general formula (2), M is Al, Si, Ti, V, Cr, Mn, Fe, Co, Ni, Cu, Zn, Ge, Zr, Nb, Mo, Sn, Sb, Ta, W, Pb or Ce, and z is the atomic valence of M. R$^1$ in general formula (1) and $R^3$ in general formula (2) are each an alkyl group of 1–5 carbon atoms, an acyl group of 1–6 carbon atoms or an aryl group of 1–9 carbon atoms. $R^2$ in general formula (2) is a monovalent organic group of 1–8 carbon atoms and n is an integer of from 1 to (z–2). $R^1$, $R^2$ and $R^3$ may be the same or different.)

The polymer particles according to a second aspect of the present invention are characterized by being obtained by polycondensation of at least one from among Compound 1 represented by general formula (1) in claim 1, hydrolysates of Compound 1 and partial condensates of Compound 1, in the presence of polymer particles according to the first invention, and by having a mean particle size of 3–1000 nm.

The polymer particles according to the second aspect of the present invention are characterized by being obtained by polycondensation of at least one from among Compound 1 represented by general formula (1), hydrosylates of Compound 1 and partial condensates or Compound 1, in the presence of polymer particles according to the first invention, and by having a mean particle size of 3–1000 nm.

In polymer particles according to a fourth aspect of the present invention, M of general formula (1) and general formula (2) is Si, Al, Ti or Zn.

In polymer particles according to a fifth aspect of the present invention, $R^1$ of general formula (1) and $R^3$ of general formula (2) are alkyl groups of 1–3 carbon atoms, $R^2$ of general formula (2) is an alkyl group of 1–3 carbon atoms, and n is 1 or 2.

In polymer particles according to a sixth aspect of the present invention, the proportion of polycondensation is 98-20 wt % of at least one from among Compound 1, hydrolysates of Compound 1 and partial condensates of Compound 1, and 2–80 wt % of at least one from among Compound 2, hydrolysates of Compound 2 and partial condensates of Compound 2.

In polymer particles according to a seventh aspect of the present invention, the polycondensation is carried out using a reaction medium comprising an alkaline aqueous solution containing ammonia or potassium hydroxide.

A polishing material according to the eighth aspect of the present invention is characterized by containing polymer particles and water obtained by polycondensation of at least one from among Compound 1, hydrosylates of Compound 1 and partial condensates or Compound 1, in a proportion of 10–150 parts by weight with respect to 100 parts by weight of polymer particles.

A polishing material according to the eighth aspect of the present invention is characterized by containing polymer particles and water.

A polishing material according to a ninth aspect of the present invention further contains an oxidizing agent and an acid.

A polishing material according to a tenth aspect of the present invention is used for chemical mechanical polishing.

In a polishing material according to a eleventh aspect of the present invention, the oxidizing agent is hydrogen peroxide, and the acid is one or more from among gluconic acid, lactic acid, citric acid, tartaric acid, malic acid, glycolic acid, malonic acid, formic acid, oxalic acid, succinic acid, fumaric acid, maleic acid and phthalic acid.

In a polishing material according to a twelfth aspect of the present invention, the concentration of the acid is 0.1–10 wt %.

A polishing material according to a thirteenth aspect of the present invention further contains a polyvalent metal ion.

In a polishing material according to a fourteenth aspect of the present invention, the metal salt comprises the polyvalent metal ion is one or more from among nitric acid salts, sulfuric acid salts, acetic acid salts and gluconic acid salts of aluminum, nitric acid salts, sulfuric acid salts, acetic acid salts and gluconic acid salts of iron (III), and nitric acid salts, sulfuric acid salts, acetic acid salts and gluconic acid salts of copper (II).

The polymer particles of the present invention, which are prepared by polycondensation of Compound 1 and the like, and Compound 2 and the like, have a nearly spherical shape while not being too hard and having suitable elasticity. Specifically, the polymer particles of the invention have adequate strength and hardness, excellent heat resistance, appropriate flexibility and a prescribed mean particle size, and they are therefore useful as polishing materials particularly CMP slurries and the like.

The polymer particles are prepared by covering the surface of polymer particles with a polymer produced from Compound 1 and the like, or by forming a film of a polymer produced from Compound 1 and the like, on the surface of polymer particles. This gives the polymer particles suitable elasticity coupled with high surface hardness. In other words, the polymer particles are polymer particles with high surface hardness, prepared by covering the surface of polymer particles with a harder polymer, or forming a film of a harder polymer thereon. These polymer particles are therefore useful as polishing materials, particularly CMP slurries and the like.

The polymer particles of the present invention can also be utilized for a wide field of purposes including, in addition to polishing materials, particularly CMP slurries, also cosmetics, electronic materials, magnetic materials, semiconductor materials, coating materials, paints, spacers, optical materials, catalysts, photocatalysts, fillers, electronic material film lubricants, diagnostic agents, drugs, conductive materials, sensor materials, toners, resin modifiers, inks, adsorbing agents, ultraviolet-resistant materials and masking materials.

Polishing materials contain polymer particles with water, and therefore exhibit excellent polishing performance as aqueous polishing materials. These polishing materials have polymer particles dispersed in water, and therefore do not have the problems of thickening or gelling during storage, or of separation and precipitation of the polymer particles. Polishing rates can also be increased with surface defects (scratches) on surface of polishing wafer, and with minimal residue of polymer particles on surfaces of polishing wafer after washing. They are particularly useful, therefore, for chemical mechanical polishing of semiconductor wafers, magnetic disks and the like.

DETAILED DESCRIPTION OF THE INVENTION

The present invention will now be explained in greater detail.

The aforementioned "Compound 1"represented by general formula (1) may be at least one from among tetrafunctional organic silicon compounds, trifunctional organic aluminum compounds, tetrafunctional organic titanium compounds and tetrafunctional organic zirconium compounds, as well as other organic metal compounds containing V, Cr, Mn, Fe, Co, Ni, Cu, Zn, Ge, Nb, Mo, Sn, Sb, Ta, W, Pb or Ce. The aforementioned "Compound 2"represented by general formula (2) may be at least one from among organic silicon compounds wherein n is an integer of from 1 to (z–2), as well as other organic metal compounds such as organic aluminum compounds, organic titanium compounds and organic zirconium compounds.

One each of Compound 1 and Compound 2 may be used, or two or more thereof may be used in combination.

As alkyl groups for $R^1$ in general formula (1) and $R^3$ in general formula (2) there may be mentioned methyl, ethyl, n-propyl, iso-propyl, n-butyl, sec-butyl, tert-butyl and n-pentyl. As acyl groups there may be mentioned acetyl, propionyl, butyryl, valeryl and caproyl. As aryl groups there may be mentioned phenyl and tolyl. Preferred among these are methyl, ethyl, n-propyl and iso-propyl. $R^1$ in Compound 1 and $R^2$ and $R^3$ in Compound 2 may be the same or different.

As $R^2$ in general formula (2) there may be mentioned alkyl groups such as methyl, ethyl, n-propyl, iso-propyl, n-butyl, sec-butyl, tert-butyl, n-hexyl, n-heptyl, n-octyl and 2-ethylhexyl. In addition to various organic groups such as vinyl, allyl, cyclohexyl, phenyl, acyl, glycidyl, acryloxy, methacryloxy, ureido, amido, fluoroacetoamido and isocyanate groups, there may also be mentioned substituted derivatives of these different organic groups. Among these, $R^2$ is preferably methyl, ethyl, n-propyl or iso-propyl.

As substituents in the substituted derivatives there may be mentioned halogen atoms, substituted or unsubstituted amino groups, hydroxyl groups, mercapto groups, isocyanate groups, glycidoxy groups, 3,4-epoxycyclohexyl groups, acryloxy groups, methacryloxy groups and ureido groups. The number of carbon atoms in $R^2$ composed of these substituted derivatives is limited to no more than 8, including the carbon atoms of the substituents.

A more detailed explanation will now be provided regarding the preferred organic silicon compounds, organic aluminum compounds, organic titanium compounds and organic zirconium compounds for Compound 1 and Compound 2.

As specific examples of Compound 1 there may be mentioned tetramethoxysilane, tetraethoxysilane, tetra-n-propoxysilane, tetra-iso-propoxysilane and tetra-n-butoxysilane. Also to be mentioned are organic titanium compounds such as tetramethoxytitanium, tetraethoxytitanium, tetrapropoxytitanium and tetrabutoxytitanium, wherein the silicon atoms in these compounds are replaced with titanium atoms. There may further be mentioned organic zirconium compounds such as tetrapropoxyzirconium and tetrabutoxyzirconium, wherein the silicon atoms are replaced with zirconium atoms, and organic aluminum compounds such as triethoxyaluminum and tripropoxyaluminum, wherein the silicon atoms are replaced with aluminum atoms.

Organic silicon compounds are preferred for Compound 2, and particularly preferred are organic silicon compounds where n is 1 or 2.

Among these, the following specific examples may be mentioned as organic silicon compounds where n=1.

Trialkoxysilanes such as methyltrimethoxysilane, methyltriethoxysilane, ethyltrimethoxysilane, ethyltriethoxysilane, n-propyltrimethoxysilane, n-propyltriethoxysilane, iso-propyltrimethoxysilane, iso-propyltriethoxysilane, n-butyltrimethoxysilane, n-butyltriethoxysilane, n-pentyltrimethoxysilane, n-hexyltrimethoxysilane, n-heptyltrimethoxysilane, n-octyltrimethoxysilane, vinyltrimethoxysilane, vinyltriethoxysilane, cyclohexyltrimethoxysilane, cyclohexyltriethoxysilane, phenyltrimethoxysilane, phenyltriethoxysilane, 3-chloropropyltrimethoxysilane, 3-chloropropyltriethoxysilane, 3,3,3-trifluoropropyltrimethoxysilane, 3,3,3-trifluoropropyltriethoxysilane, 3-aminopropyltrimethoxysilane, 3-aminopropyltriethoxysilane, 2-hydroxyethyltrimethoxysilane, 2-hydroxyethyltriethoxysilane, 2-hydroxypropyltrimethoxysilane, 2-hydroxypropyltriethoxysilane, 3-hydroxypropyltrimethoxysilane, 3-hydroxypropyltriethoxysilane,
3-mercaptopropyltrimethoxysilane, 3-mercaptopropyltriethoxysilane, 3-isocyanatopropyltrimethoxysilane, 3-isocyanatopropyltriethoxysilane, 3-glycidoxypropyltrimethoxysilane, 3-glycidoxypropyltriethoxysilane, 2-(3,4-epoxycyclohexyl) ethyltrimethoxysilane, 2-(3,4-epoxycyclohexyl) ethyltriethoxysilane, 3-(meta)acryloxypropyltrimethoxysilane, 3-(meta)acryloxypropyltriethoxysilane, 3-ureidopropyltrimethoxysilane and 3-ureidopropyltriethoxysilane.

The following specific examples may be mentioned as organic silicon compounds where n=2.

Dimethyldimethoxysilane, dimethyldiethoxysilane, diethyldimethoxysilane, diethyldiethoxysilane, di-n-propyldimethoxysilane, di-n-propyldiethoxysilane, di-iso-propyldimethoxysilane, di-iso-propyldiethoxysilane, di-n-butyldimethoxysilane, di-n-butyldiethoxysilane, di-n-pentyldimethoxysilane, di-n-pentyldiethoxysilane, di-n-hexyldimethoxysilane, di-n-hexyldiethoxysilane, di-n-heptyldimethoxysilane, di-n-heptyldiethoxysilane, di-n-octyldimethoxysilane, di-n-octyldiethoxysilane, di-n-cyclohexyldimethoxysilane, di-n-cyclohexyldiethoxysilane, diphenyldimethoxysilane and diphenyldiethoxysilane.

There may also be used as Compound 2 oxysilanes such as methyltriacetyloxysilane and dimethyldiacetyloxysilane. In addition, there may be used as Compound 2 titanate coupling agents such as iso-propyltrioctanoyl titanate, organic zirconium compounds such as acetylacetonezirconium butyrate and organic aluminum compounds such as acetoalkoxyaluminum isopropylate.

Among these examples for Compound 2, methyltrimethoxysilane and methyltriethoxysilane are preferred when n=1, and dimethyldimethoxysilane and dimethyldiethoxysilane are preferred when n=2. When tetraethoxysilane is used as Compound 1, methyltriethoxysilane is most preferred to be used as Compound 2 in combination therewith. Thus, four $R^1$ groups and two or three $R^3$ groups are preferably the same and $R^1$ and $R^3$ are preferably the same, in order to more easily promote polycondensation.

Compound 1 may be used, or a "hydrolysate" or "partial condensate" of Compound 1 may be used instead of Compound 1. Two or more from among Compound 1, its hydrolysates and its partial condensates may also be used. Compound 2 may be used, or a "hydrolysate" or "partial condensate" of Compound 2 may be used instead of Compound 2. Two or more from among Compound 2, its hydrolysates and its partial condensates may also be used. As partial condensates of Compound 1 or 2 there may be used ones with polycondensable functional groups.

There are no particular restrictions on the organic solvent which is commonly used as one type of reaction medium for polycondensation, and it may be one that is a suitable solvent for Compounds 1 and 2, and the like, and that can evenly disperse and mix the compounds in the reaction medium. As organic solvents there may be mentioned alcohols, aromatic hydrocarbons, ethers, ketones and esters. These may be used alone, or in combinations of two or more that are uniformly miscible.

As alcohols there may be mentioned ethanol, methanol, n-propyl alcohol, iso-propyl alcohol, n-butyl alcohol, sec-butyl alcohol, tert-butyl alcohol, n-hexyl alcohol and n-octyl alcohol. In addition there may be mentioned ethylene glycol, diethylene glycol, triethylene glycol, ethyleneglycol monobutyl ether and ethyleneglycol monoethyl ether.

As aromatic hydrocarbons there may be mentioned benzene, toluene and xylene, and as ethers there may be mentioned tetrahydrofuran and dioxane. As ketones there may be mentioned acetone, methyl ethyl ketone, methyl isobutyl ketone and diisobutyl ketone, and as esters there may be mentioned ethyl acetate, propyl acetate, butyl acetate and propyl carbonate.

There are no particular restrictions on the alkaline aqueous solution which is commonly used as a reaction medium together with an organic solvent, and it may be one which hydrolyzes Compound 1 or 2, and the like, for polycondensation. As alkaline aqueous solutions there may be mentioned aqueous solutions of ammonia, sodium hydroxide, potassium hydroxide and amine compounds, among which ammonia water and aqueous potassium hydroxide are particularly preferred.

The dispersion containing polymer particles may be obtained by hydrolysis and polycondensation of Compound 1 and 2, and the like, in a mixed medium comprising an organic solvent and an alkaline aqueous solution. Compound 1 and the like, is further added to the dispersion for hydrolysis and polycondensation on the surfaces of the polymer particles of the claim 1 to make a dispersion containing polymer particles which are further hardened only on the surface. This provides a hydrophilic property so that when used as a CMP slurry in a medium composed mainly of water, not only is the performance enhanced but the aqueous dispersion is rendered more stable and easier to manage. Here, the amount of Compound 1 and the like, which is polycondensed in the presence of the polymer particles of the claim 1 is preferably in a proportion of 10–150 parts by weight to 100 parts by weight of the polymer particles.

The particle size of the polymer particles obtained in this manner were measured by transmission electron microscopy. The mean particle size as calculated from the particle sizes of at least 200 polymer particles is 3–1000 nm, particularly 5–500 nm, and especially 10–300 nm. It is not preferred for the mean particle size to less than 3 nm because the small particle size reduces the polishing rate during use as a CMP slurry, and cannot provide the required properties for various uses including electronic materials, magnetic materials, optical materials and the like. On the other hand, it is not preferred for the mean particle size to exceed 1000 nm because the storage stability of the aqueous dispersion will be reduced, and scratches may occur on the surface of polishing wafer during use as a CMP slurry.

The polymer particles can be easily produced by stirring and mixing Compounds 1 and 2, and the like, for about 30–300 minutes in the aforementioned mixed solvent at 30–90° C., particularly 40–80° C. and especially 50–70° C. The ratio of Compound 2 maybe 0.1–60 parts by weight with respect to 100 parts by weight of the total amount of Compound 1 and the like, and Compound 2 and the like, and particularly preferred is 1–40 parts by weight, and especially 2–20 parts by weight. When the amount of Compound 2 and the like is less than 0.1 part by weight, the polymer particles will not be able to exhibit suitable softness, such that scratches will often be produced on the surface of polishing wafer during use as a CMP slurry, and the performance required for the various uses mentioned above cannot be achieved. On the other hand, the amount of Compound 2 and the like, is preferably not over 60 parts by weight because the polymer particles will have insufficient hardness, which can lead to reduced polishing performance.

The polymer particles may be used as a CMP slurry, and specifically the polymer particles may be dispersed in water to make a CMP slurry according to claim 8 or 15. The CMP slurry is useful for chemical mechanical polishing particularly of semiconductor wafers, magnetic disks and the like. When used as a CMP slurry composed of an aqueous dispersion, all or part of the organic solvent such as alcohol included in the dispersion is usually removed, for use substantially as an aqueous dispersion.

The polymer particle content may be 0.1–20 parts by weight, and is particularly preferred to be 1–15 parts by weight and especially 2–10 parts by weight, with respect to 100 parts by weight of the aqueous dispersion. When the abrasive content is less than 0.1 part by weight, the polishing performance will not be adequately enhanced, while it is also preferably not included at greater than 20 parts by weight because this will increase the cost and lower the stability of the aqueous dispersion.

The polishing material, particularly the CMP slurry composed of the aqueous dispersion may be combined with prescribed chemical agents to be used for polishing of various different polishing wafer and the like. When potassium hydroxide, ammonia or the like is combined therewith, it may be used for polishing of insulating films, and when an etching agent such as an oxidizing agent or acid is combined therewith, it may be used for polishing of metal films of tungsten, aluminum, copper, and the like. The polishing material (particularly the CMP slurry) may also be used in combination with other polishing materials (particularly the CMP slurries) in an appropriate proportion.

The "oxidizing agent" used is not particularly restricted so long as it is water-soluble, and it is preferably selected as appropriate depending on the electrochemical properties of the metal layer of the film target of the semiconductor device, based on a Pourbaix diagram, for example. As specific oxidizing agents there may be mentioned organic peroxides such as hydrogen peroxide, peracetic acid, perbenzoic acid, tert-butylhydroperoxide, and the like.; permanganate compounds such as potassium permanganate, and the like.; bichromate compounds such as potassium bichromate, and the like.; halogenate compounds such as potassium iodate, and the like.; nitric compounds such as nitric acid, iron nitrate, and the like.; perhalogenate compounds such as perchloric acid, and the like.; transition metal salts such as potassium ferricyanide, and the like.; persulfuric compounds such as ammonium persulfate, and the like.; polyvalent metal salts such as iron nitrate, cerium ammonium nitrate, and the like.; and heteropoly acids such as silicotungstic acid, phosphotungstic acid, silicomolybdic acid, phosphomolybdic acid, and the like. Two or more of these may also be used in combination. Among these, hydrogen peroxide and organic peroxides are particularly preferred because they contain no metal elements and their decomposition products are harmless. By including such oxidizing agents it is possible to vastly increase the polishing rate for polishing of metal layers, and particularly of target films of semiconductor devices.

The oxidizing agent content may be 0.1–15 parts by weight, and is particularly preferred to be 0.3–10 parts by weight and especially 0.5–8 parts by weight, with respect to 100 parts by weight of the aqueous dispersion. When this content is less than 0.1 part, the polishing rate of the aqueous dispersion will not be adequately enhanced, while, when it is included at greater than 15 parts by weight, it is possible to adequately increase the polishing rate and it is not necessary to be preferably included in large quantities such as greater than 15 parts by weight.

By adding the aforementioned "acid" to adjust the pH, it is possible to improve the dispersability and stability of the aqueous dispersion and increase the polishing rate. The acid is not particularly limited, and any organic acid or inorganic acid may be used. As organic acids there may be mentioned para-toluenesulfonic acid, dodecylbenzenesulfonic acid, isoprenesulfonic acid, gluconic acid, lactic acid, citric acid, tartaric acid, malic acid, glycolic acid, malonic acid, formic acid, oxalic acid, succinic acid, fumaric acid, maleic acid and phthalic acid. Preferred among these are gluconic acid, lactic acid, citric acid, tartaric acid, malic acid, glycolic acid, malonic acid, formic acid, oxalic acid, succinic acid, fumaric acid, maleic acid and phthalic acid. Particularly preferred are tartaric acid, malic acid, succinic acid and phthalic acid. These organic acids may be used alone or in combinations of two or more. As inorganic acids there may be mentioned nitric acid, hydrochloric acid, sulfuric acid, and the like., and these inorganic acids may also be used alone or in combinations of two or more. Organic acids and inorganic acids may also be used together. These acids may be added at 0.1–10 parts by weight, and especially 1–8 parts by weight, with respect to 100 parts by weight of the aqueous dispersion. The acid content is preferably in the range of 0.1–10 parts by weight because this will give an aqueous dispersion with excellent dispersability and adequate stability, and will reduce etching, and the like., and allow a higher polishing rate.

A polyvalent metal ion may also be added. As polyvalent metal ions there may be mentioned metal ions of aluminum, titanium, vanadium, chromium, manganese, iron, cobalt, nickel, copper, zinc, germanium, zirconium, molybdenum, tin, antimony, tantalum, tungsten, lead and cerium. One single species may be used, or two or more polyvalent metal ions may be used together. Particularly preferred as polyvalent metal ions are one or more metal ions of aluminum, titanium, chromium, manganese, iron, copper, zinc, tin and cerium, because they allow an even higher polishing rate.

The polyvalent metal ion content in the aqueous dispersion is preferably 3–3000 ppm. The content is more preferably 10–2000 ppm, and especially 30–1000 ppm. The polyvalent metal ion has an effect of promoting the function of the oxidizing agent, and When the content of the polyvalent metal ion is not less than 3 ppm, the promoting effect will be insufficient and the polishing rate will not be adequately increased. It is also not preferred for the polyvalent metal ion to be added at greater than 3000 ppm because the film targets of semiconductor devices will be contaminated by the metal ion.

The polyvalent metal ion can be produced by adding to the aqueous medium a salt or complex, such as a sulfate or acetate salt, containing a polyvalent metal element, or it may be produced by adding an oxide of a polyvalent metal element. Even a compound that produces a monovalent metal ion when added to the aqueous medium may be used, so long as the ion is converted to a polyvalent metal ion by the oxidizing agent.

The medium for the aqueous dispersion of the invention may be water, a mixed solution of water and methanol, a mixed solution of water and ethanol, or the like, but water alone is particularly preferred.

As film targets with metal layers there may be mentioned pure tungsten films, pure aluminum films, pure copper films, and the like., as well as films made of alloys of tungsten, aluminum, copper, and the like., with other metals, that are formed on semiconductor boards during production processes for semiconductor devices such as super LSIs.

EXAMPLES

The present invention will now be explained in greater detail by way of examples.

The polishing rate and scratch condition of the wafers of the examples and comparative examples were evaluated as follows.

Polishing rate: Using an apparatus (Model "LGP-510") by Lapmaster SFT, a pad (double layer structure, Part No. "IC1000"/"SUBA400") by Rodel Nitta was mounted on the lap plate of the apparatus and a wafer was fitted onto the head for 3 minutes of polishing. The polishing conditions were an applied pressure of 350 g/cm$^2$, a plate rotation rate of 50 rpm, a head rotation rate of 50 rpm and a CMP slurry supply rate of 200 milliliters per minute. The polishing rate was determined by measuring the remaining film thickness (Å) of the polished oxide film or metal film and dividing this film thickness by the polishing time (3 minutes) to calculate the polishing rate. The film thicknesses of the oxide films were measured with an interference film thickness probe/FTP500 (product of SENTECH). The sheet resistance values of the metal films were measured with a Model Sigma 5 Resistance Meter (product of NPS) by the direct current 4-probe method, and the film thicknesses (Å) of the metal films were calculated from the volume resistance of the metals.

Scratch condition: After polishing the wafer in the manner described above, the wafer was thoroughly washed with running water and then washed with ultrasonic waves for 20 minutes, after which the wafer was dried in a spin drier and the surface of the wafer was observed using a differential interferometer microscope.

(1) Preparation of Aqueous Dispersion CMP Slurry and Polishing of Wafer

Example 1

While stirring and mixing 800 parts by weight of ethyl alcohol and 600 parts by weight of 12 wt % ammonia water at 60° C., there was poured therein a mixture of 96 parts by weight of tetraethoxysilane and 4 parts by weight of methyltriethoxysilane. The substance was transparent when first poured in, but after 3 minutes turned a bluish-white color, and after 3 hours there was obtained a dispersion with a medium of white polymer particles. Observation with a transmission electron microscope revealed that the polymer particles were spherical with a mean particle size of 210 nm.

This dispersion was then placed under reduced pressure with a rotary evaporator, and water was added while removing the ethyl alcohol and ammonia to produce an aqueous dispersion with 15 wt % of a solid content and 9 of a pH, and exhibiting a chemical mechanical polishing effect. Potassium hydroxide was then added to the aqueous dispersion to obtain a CMP slurry comprising an aqueous dispersion with 10 wt % of solid content and 11.5 of pH. This CMP slurry was used for polishing of a silicon wafer having a 6-inch thermal oxidation film, and the polishing rate was as high as 1500 Å/min with no scratches observed.

Comparative Example 1

A dispersion with polymer particles as the medium was obtained in the same manner as Example 1, except that 100 parts by weight of tetraethoxysilane was used instead of the 96 parts by weight of tetraethoxysilane and 4 parts by weight of methyltriethoxysilane. Observation with a transmission electron microscope revealed that the polymer particles were spherical with a mean particle size of 230 nm. The procedure of Example 1 was followed thereafter to obtain an aqueous dispersion exhibiting a chemical mechanical polishing effect. A CMP slurry comprising this aqueous dispersion was also obtained in the same manner. The CMP slurry was used for polishing of a silicon wafer having a 6-inch thermal oxidation film, and although no scratches were observed, the polishing rate was low at 300 Å/min.

Comparative Example 2

Reaction was conducted in the same manner as Example 1 except that 100 parts by weight of methyltriethoxysilane was used instead of the 96 parts by weight of tetraethoxysilane and 4 parts by weight of methyltriethoxysilane, but gelation occurred so that polymer particles could not be obtained.

Example 2

While stirring and mixing 800 parts by weight of ethyl alcohol and 600 parts by weight of 12 wt % ammonia water at 60° C., there was poured therein a mixture of 85 parts by weight of tetraethoxysilane and 15 parts by weight of methyltriethoxysilane. The substance was transparent when first poured in, but after 3 minutes turned a bluish-white color, and after 3 hours there was obtained a white dispersion with a medium of polymer particles. Observation with a transmission electron microscope revealed that the polymer particles were spherical with a mean particle size of 180 nm.

To the dispersion there was continuously added 50 parts by weight of tetraethoxysilane over a period of 10 minutes for hydrolysis and polycondensation, to obtain a dispersion containing composite particles (polymer particles corresponding to the second invention) comprising the polymer particles and a tetraethoxysilane polycondensate produced on their surfaces. Observation with a transmission electron microscope revealed that the mean particle size of the composite particles was 206 nm. No production of new particles composed of the tetraethoxysilane polycondensate was found.

The dispersion containing the composite particles was then placed under reduced pressure with a rotary evaporator, and water was added while removing the ethyl alcohol and ammonia to produce an aqueous dispersion with 20 wt % of solid content and 9 of pH, and exhibiting a chemical mechanical polishing effect. Prescribed amounts of 0.5 wt % aqueous succinic acid and 0.5 wt % hydrogen peroxide were then combined with the aqueous dispersion to obtain a CMP slurry comprising an aqueous dispersion with a solid concentration of 5 wt %. This CMP slurry was used for one minute of polishing of a silicon wafer having a 6-inch, 5000 Å copper film, and the polishing rate was as high as 3000 Å/min with no scratches observed.

Comparative Example 3

The aqueous dispersion of Comparative Example 1 was used for polishing of a silicon wafer having a 6-inch, 5000 Å copper film in the same manner as Example 2, except that the CMP slurry used also contained a chemical agent in the aqueous dispersion for chemical mechanical polishing of the copper film of Example 2. As a result, the polishing rate was 2500 Å/min and posed no problem, but there were numerous scratches and observation with a scanning microscope revealed residue of the polymer particles on the copper film surface even after washing.

Example 3

A CMP slurry was obtained comprising an aqueous dispersion for chemical mechanical polishing of aluminum films, which contained 3% of the composite particles with a mean particle size of 206 nm synthesized in Example 2, 1% aluminum nitrate (720 ppm in terms of aluminum ions) and 0.5% ammonium persulfate. This CMP slurry was used for polishing of an aluminum film (thickness: 5000 Å, containing 1% copper) on a silicon wafer with an 8-inch thermal oxidation film, by the same method as Example 2. The polishing rate was as high as 3700 Å/min with no scratches observed.

Example 4

A CMP slurry was obtained comprising an aqueous dispersion for chemical mechanical polishing of tungsten films, which contained 3% of the composite particles with a mean particle size of 206 nm synthesized in Example 2, 2% hydrogen peroxide, 0.4% copper gluconate (560 ppm in terms of copper ions) and 0.2% malonic acid. This CMP slurry was used for polishing of a tungsten film (thickness: 5000 Å) on a silicon wafer with an 8-inch thermal oxidation film, by the same method as Example 2. The polishing rate was as high as 3700 Å/min with no scratches observed.

Example 5

While stirring and mixing 800 parts by weight of ethyl alcohol and 600 parts by weight of 12 wt % ammonia water at 40° C., there was poured therein a mixture of 90 parts by weight of tetraethoxysilane and 10 parts by weight of dimethyldiethoxysilane. The substance was transparent when first poured in, but after one hour there was obtained a dispersion with a medium of polymer particles. Observation with a transmission electron microscope revealed that the polymer particles were spherical with a mean particle size of 90 nm.

To the dispersion there was continuously added 50 parts by weight of tetraethoxysilane over a period of 10 minutes for hydrolysis and polycondensation, to obtain a dispersion containing composite particles comprising the polymer particles and a tetraethoxysilane polycondensate produced on their surfaces. Observation with a transmission electron microscope revealed that the mean particle size of the composite particles was 102 nm. No production of new particles composed of the tetraethoxysilane polycondensate was found.

The dispersion containing the composite particles was then placed under reduced pressure with a rotary evaporator, and water was added while removing the ethyl alcohol and ammonia to produce an aqueous dispersion with 15 wt % of solid content and 8 of a pH. A CMP slurry for copper was then obtained by combining 5% of these composite particles, 2% hydrogen peroxide and 2% lactic acid. The CMP slurry was used for polishing of an 8-inch copper wafer (trade name: "SKW-6-2", product of SKW Associates) with the same polishing apparatus and polishing conditions as above. As a result, the polishing rate was sufficiently high at 4900 Å/min. Upon evaluation with a contact stylus surface roughness tester (Model "P-10" by KLA Tencor Japan Ltd.), dishing of 100 μm wiring was 800 Å, indicating very excellent flatness.

Comparative Example 4

A CMP slurry was obtained comprising the aqueous dispersion prepared in Comparative Example 1, and the CMP slurry was used for similar polishing of the copper wafer of Example 5 and evaluated in the same manner. As a result, the polishing rate was rather low at 1900 Å/min, and dishing of 100 μm wiring was 1700 Å, indicating rather poor flatness.

(2) Polishing of Magnetic Disk Plate

Water was used for dilution of the polymer particles or composite particles in the aqueous dispersions obtained in Examples 1 and 2 to 5 wt % concentration, and then aluminum nitrate was added to the dilutions as a polishing accelerator to a 5 wt % concentration to obtain CMP slurries. For comparison, CMP slurries were also prepared with the same composition but containing 5 wt % of colloidal silica (trade name: "Snowtex 20", product of Nissan Chemical Industries) or fumed silica (trade name: "Aerosil #90", product of Nihon Aerosil Co., Ltd).

These CMP slurrys were used for polishing of magnetic disk plates under the following conditions, and the polishing rates and scratch conditions were evaluated.

<Polishing Conditions>
Substrate: Ni—P electroless plated 3.5-inch aluminum disk (already subjected to one step of polishing)
Polymer apparatus: Model "LM-15C" by Lapmaster SFT Corp.
Polishing pad: Trade name: "Polydex DG", by Rodel (U.S.)
Working pressure: 70 g/cm$^2$
Plate rotation rate: 50 rpm
CMP slurry supply rate: 15 ml/min.
Polishing time: 10 minutes
<Evaluation Method>
Polishing rate: The polishing rate was determined by the following equation, based on the weight reduction of the disk by polishing.

Polishing rate (nm/min)=[(W/d)/S]×10$^7$

W=weight reduction by polishing per minute, d=Ni—P electroless plating density, S=polishing target area
Scratches: After washing and drying of the polished disk, it was placed under a spotlight in a dark room and the presence of scratches was visually observed.

As a result of the polishing carried out in this manner, the polishing rates with the aqueous dispersions of Example 1 and Example 2 were 160 nm/min and 180 nm/min, respectively. However, when colloidal silica and fumed silica were used, the Polishing rates were 128 nm/min and 145 nm/min, respectively. Thus, when the CMP slurries of the invention were used for polishing of magnetic disks, the polishing rates were high and absolutely no scratches were produced. However, when colloidal silica or fumed silica was used, the polishing rate was rather low, but numerous scratches were observed on the surface of polishing disks.

What is claimed is:

1. A polishing material, comprising water and at least one polymer particle having size of 3–1000 nm, which is obtained by polycondensation of at least one member chosen from the group consisting of:

(A) a compound represented by formula 1;

$M(OR^1)_z$ (B) hydrolysates of the compound represented by formula 1, and (C) partial condensates of the compound represented by formula 1, wherein said polycondensation occurs in the presence of a preliminary polymer particle having a mean particle size of 3–1000 nm, said preliminary polymer particle obtained by polycondensation of at least one member chosen from the group consisting of (A), (B) and (C) and at least one member chosen from the group consisting of:

(i) a compound represented by formula 2:

$(R^2)_n M(OR^3)_{z-n}$ (ii) hydrolysates of formula 2, and
(iii) partial condensates of formula 2,
wherein,
M is a member chosen from the group consisting of Al, Si, Ti, V, Cr, Mn, Fe, Co, Ni, Cu, Zn, Ge, Zr, Nb, Mo, Sn, Sb, Ta, W, Pb and Ce;
z is the atomic valence of M;
$R^1$ and $R^3$ are chosen from the group consisting of an alkyl group of 1–5 carbons, an aryl group of 1–6 carbons, and an aryl group of 1–9 carbons;
$R^2$ is a monovalent organic group of 1–8 carbons; and
n is an integer from 1 to (z–2),
and wherein $R^1$, $R^2$ and $R^3$ may be the same or different.

2. The polishing material according to claim 1, further comprising an oxidizing agent and an acid.

3. A polishing material according to claim 2, wherein said oxidizing agent is hydrogen peroxide, and said acid is at least one member selected from the group consisting of gluconic acid, lactic acid, citric acid, tartaric acid, malic acid, glycolic acid, malonic acid, formic acid, oxalic acid, succinic acid, fumaric acid, maleic acid and phthalic acid.

4. A polishing material according to claim 2, wherein the concentration of said acid is from 0.1 to 10 wt %.

5. The polishing material according to claim 2, further contains a polyvalent metal ion.

6. The polishing material according to claim 2, further comprising a metal salt comprising a polyvalent metal ion wherein the metal salt is at least one member selected from the group consisting of a nitric acid salt of aluminum, sulfuric acid salt of aluminum, acetic acid salt of aluminum, gluconic acid salt of aluminum, nitric acid salt of iron (III), sulfuric acid salt of iron (III), acetic acid salt of iron (III), gluconic acid salt of iron (III), nitric acid salt of copper (II), sulfuric acid salt of copper (II), acetic acid salt of copper (II) and gluconic acid salt of copper (II).

7. A method for chemical mechanical polishing, comprising polishing a surface of a polishing wafer with a slurry comprising water and at least one polymer particle having size of 3–1000 nm, which is obtained by polycondensation of at least one member chosen from the group consisting of:

(A) a compound represented by formula 1:

$M(OR^1)_z$ (B) hydrolysates of the compound represented by formula 1, and (C) partial condensates of the compound represented by formula 1, wherein said polycondensation occurs in the presence of a preliminary polymer particle having a mean particle size of 3–1000 nm, said preliminary polymer particles obtained by polycondensation of at least one member chosen from the group consisting of (A), (B) and (C) and at least one member chosen from the group consisting of:

(i) a compound represented by formula 2:

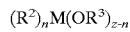
$(R^2)_n M(OR^3)_{z-n}$ (ii) hydrolysates of formula 2, and (iii) partial condensates of formula 2, wherein, M is a member chosen from the group consisting of Al, Si, Ti, V, Cr, Mn, Fe, Co. Ni, Cu, Zn, Ge, Zr, Nb, Mo, Sn, Sb, Ta, W, Pb and Ce;

z is the atomic valence of M;

$R^1$ and $R^3$ are chosen from the group consisting of an alkyl group of 1–5 carbons, an acyl group of 1–6 carbons, and an aryl group of 1–9 carbons;

$R^2$ is a monovalent organic group of 1–8 carbons; and n is an integer from 1 to (z−2), and wherein $R^1$, $R^2$ and $R^3$ may be the same or different.

8. The method for chemical mechanical polishing according to claim 7, wherein said slurry further comprises an oxidizing agent and an acid.

9. The method for chemical mechanical polishing according to claim 8, wherein said oxidizing agent is hydrogen peroxide, and said acid is at least one member selected from the group consisting of gluconic acid, lactic acid, citric acid, tartaric acid, malic acid, glycolic acid, malonic acid, formic acid, oxalic acid, succinic acid, fumaric acid, maleic acid and phthalic acid.

10. The method for chemical mechanical polishing according to claim 9, wherein said slurry for chemical mechanical polishing further contains potassium hydroxide or ammonia.

11. The method for chemical mechanical polishing according to claim 10, wherein said polishing wafer comprises at least one metal film.

12. The method for chemical mechanical polishing according to claim 8, wherein the concentration of said acid is from 0.1 to 10 wt-%.

13. The method for chemical mechanical polishing according to claim 6, wherein said slurry further comprises a polyvalent metal ion.

14. The method for chemical mechanical polishing according to claim 8, further comprising a metal salt comprising a polyvalent metal ion wherein the metal salt is at least one member selected from the group consisting of a nitric acid salt of aluminum, sulfuric acid salt of aluminum, acetic acid salt of aluminum, gluconic acid salt of aluminum, nitric acid salt of iron (III), sulfuric acid salt of iron (III), acetic acid salt of iron (III), gluconic acid salt of iron (III), nitric acid salt of copper (II), sulfuric acid salt of copper (II), acetic acid salt of copper (II) and gluconic acid salt of copper (II).

15. The method for chemical mechanical polishing according to claim 7, wherein said polishing wafer comprises at least one insulating film.

* * * * *